United States Patent
Lunsford

(10) Patent No.: US 8,721,147 B2
(45) Date of Patent: May 13, 2014

(54) SUPPLEMENTAL BRAKE LIGHT

(76) Inventor: R. Scott Lunsford, Stony Point, NC (US)

( * ) Notice: Subject to any disclaimer, the term of this patent is extended or adjusted under 35 U.S.C. 154(b) by 199 days.

(21) Appl. No.: 13/176,973

(22) Filed: Jul. 6, 2011

(65) Prior Publication Data

US 2013/0010490 A1    Jan. 10, 2013

(51) Int. Cl.
 *F21S 8/10*    (2006.01)
(52) U.S. Cl.
 USPC .......................... 362/545; 362/499; 362/487
(58) Field of Classification Search
 USPC ........................................ 362/487, 499, 545
 See application file for complete search history.

(56) References Cited

U.S. PATENT DOCUMENTS

| | | | | |
|---|---|---|---|---|
| 3,761,706 A * | 9/1973 | Frey | | 362/490 |
| 4,613,847 A * | 9/1986 | Scolari et al. | | 340/473 |
| 4,977,487 A * | 12/1990 | Okano | | 362/555 |
| 5,015,508 A * | 5/1991 | Glenn | | 427/424 |
| 6,404,334 B1 * | 6/2002 | Chao | | 340/472 |
| 6,520,669 B1 * | 2/2003 | Chen et al. | | 362/545 |
| 6,536,930 B1 * | 3/2003 | Hirmer | | 362/540 |
| 7,656,284 B2 * | 2/2010 | Dolcetta et al. | | 340/473 |
| 8,506,147 B2 * | 8/2013 | Yatsuda et al. | | 362/545 |
| 2003/0012034 A1 * | 1/2003 | Misawa et al. | | 362/545 |
| 2003/0016543 A1 * | 1/2003 | Akiyama | | 362/499 |
| 2006/0187011 A1 * | 8/2006 | van der Meer et al. | | 340/438 |
| 2007/0229246 A1 * | 10/2007 | Dolcetta et al. | | 340/473 |

* cited by examiner

*Primary Examiner* — Anabel Ton
(74) *Attorney, Agent, or Firm* — The Law Office of Jerry D. Haynes

(57) ABSTRACT

The present invention is a supplemental brake light in communication with a brake of a vehicle that includes an existing brake light, a triangular or inverted triangular casing that is disposed within the existing brake light and a plurality of LED lights that are housed within the casing. A second embodiment of the supplemental brake light includes an existing brake light, a plurality of LED lights that are housed within the existing brake light and a center LED light disposed within the center of the existing brake light. A third embodiment of the supplemental brake light includes a pair of existing brake lights, a generally rectangular casing positioned between the existing brake lights and a plurality of LED lights that are disposed within the generally rectangular casing. The LED lights become brighter and flicker as the brake is increasingly depressed in all three embodiments.

3 Claims, 5 Drawing Sheets

SUPPLEMENTAL BRAKE LIGHT

TECHNICAL FIELD & BACKGROUND

Driving can be a dangerous activity, one that could potentially be injurious or deadly if a serious collision occurs. Currently there are limited alternatives to automotive safety that avoid crashes by providing a supplemental visual alert that notifies a driver when another vehicle is coming to a stop.

The present invention generally relates to a brake light. More specifically, the invention is a supplemental brake light.

It is an object of the invention to provide a supplemental brake light that serves as an additional safety brake light.

It is an object of the invention to provide a supplemental brake light that is illuminated based on the amount of pressure applied to the brakes of a vehicle.

What is really needed is a supplemental brake light that serves as an additional safety brake light that is illuminated based on the amount of pressure applied to the brakes of a vehicle.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is utilized repeatedly. The phrase generally does not refer to the same embodiment, however, it may. The terms "comprising", "having" and "including" are synonymous, unless the context dictates otherwise.

Figure 1A:
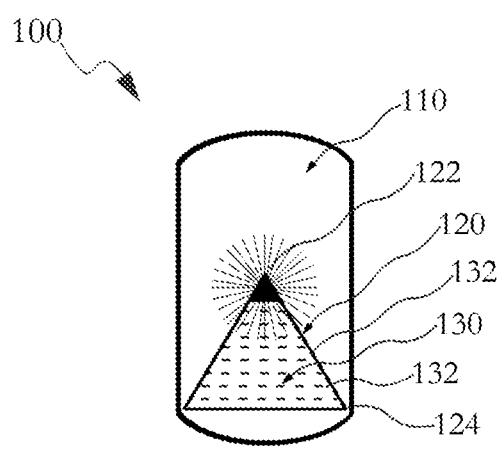
FIG. 1A illustrates a front perspective view of a supplemental brake light, in accordance with one embodiment of the present invention.

FIG. 1A illustrates a front perspective view of a supplemental brake light 100, in accordance with one embodiment of the present invention. The supplemental brake light 100 includes an existing brake light 110, a triangular casing 120 and a plurality of LED lights 130. The supplemental brake light 100 is in communication with a brake of a vehicle (not shown).

The existing brake light 110 can be any suitable brake light of any size or dimensions existing on any suitable type of vehicle. The triangular casing 120 is planar and disposed within the existing brake light 110 and has a top tip 122 and a bottom base 124. The LED lights 130 form a plurality of rows 132 that vertically move from the bottom base 124 to the top tip 122 as pressure is increased on the brakes of a vehicle (not shown). The rows 132 are illuminated and become relatively brighter as the brake pressure is increased and the rows move up the triangular casing 120. The LED lights 130 at the top tip 122 will flicker when the brakes are fully depressed. The LED lights 130 are also relatively brighter and utilize relatively brighter filaments than the existing brake light 110.

Figure 1B:
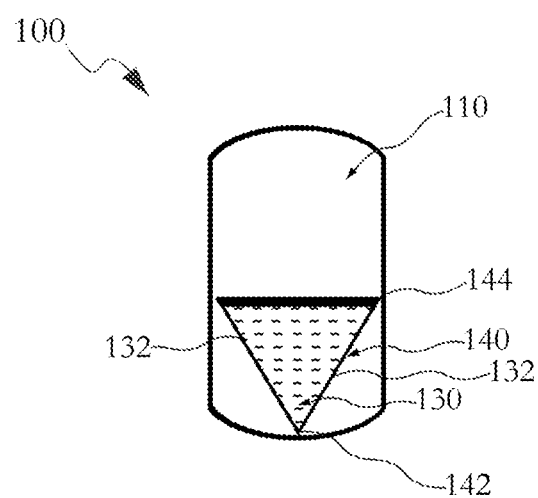
FIG. 1B illustrates a front perspective view of a supplemental brake light, in accordance with one embodiment of the present invention.

FIG. 1B illustrates a front perspective view of a supplemental brake light 100, in accordance with one embodiment of the present invention. The supplemental brake light 100 includes an inverted triangular casing 140 with a bottom tip 142 and a top base 144. The inverted triangular casing 140 houses the LED lights 130 and rows 132 that become illuminated and relatively brighter as the brake pressure is increased and the rows 132 move up the inverted triangular casing 140. The LED lights 130 at the top base 144 will flicker when the brakes are fully depressed. The other features of the supplemental brake light 100 in FIG. 1B are identical to the features illustrated in FIG. 1A and described in its description.

Figure 1C:
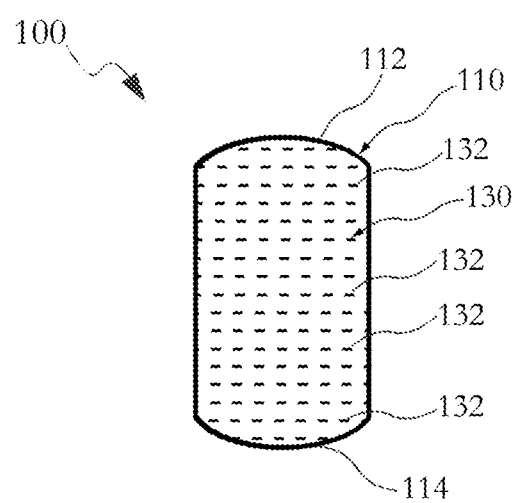
FIG. 1C illustrates a front perspective view of a plurality of LED lights of a supplemental brake light, in accordance with one embodiment of the present invention.

FIG. 1C illustrates a front perspective view of a plurality of LED lights 130 of a supplemental brake light 100, in accordance with one embodiment of the present invention. The LED lights 130 and rows 132 are disposed throughout the existing brake light 110, which includes a top 112 and a bottom 114. The LED lights 130 and rows 132 are illuminated and become relatively brighter as the brake is increasingly depressed and the rows 132 move up from the bottom 114 to the top 112 of the existing brake light 110. This embodiment of the supplemental brake light 100 does not include a triangular casing 120 or an inverted triangular casing 140.

Figure 2:
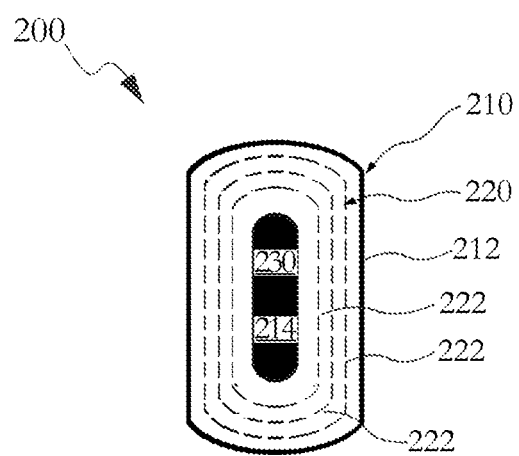
FIG. 2 illustrates a front perspective view of a supplemental brake light, in accordance with one embodiment of the present invention.

FIG. 2 illustrates a front perspective view of a supplemental brake light 200, in accordance with one embodiment of the present invention. The supplemental brake light 200 includes an existing brake light 210, a plurality of LED lights 220 and a center LED light 230.

The existing brake light 210 has a perimeter 212 and a center 214 and can be any suitable brake light of any size or dimensions existing on any suitable type of vehicle. The LED lights 220 form a plurality of internal perimeter rows 222 that move inward from the perimeter 212. The internal perimeter rows 222 become relatively brighter as the brake is increasingly depressed and the internal perimeter rows 222 are illuminated inward from the perimeter 212 of the existing brake light 210. The center LED light 230 is disposed in the center 214 of the existing brake light 210 that the internal perimeter rows 222 are illuminated inward from the perimeter 212 towards. The center LED light 230 is illuminated when the brake is fully depressed and will flicker and is relatively brighter than the internal perimeter rows 222 when the brake is held in a fully depressed position.

Figure 3:
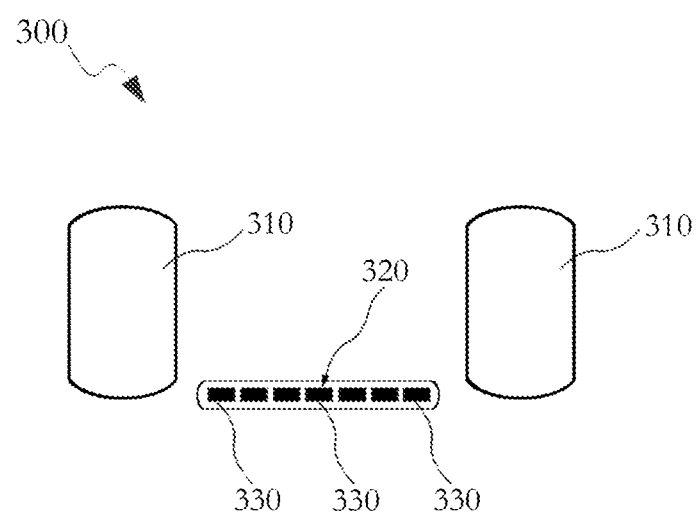
FIG. 3 illustrates a front perspective view of a supplemental brake light, in accordance with one embodiment of the present invention.

FIG. 3 illustrates a front perspective view of a supplemental brake light 300, in accordance with one embodiment of the present invention. The supplemental brake light 300 includes a pair of existing brake lights 310, a generally rectangular casing 320 and a plurality of LED lights 330.

The existing brake lights 310 can be any suitable brake light of any size or dimensions existing on any suitable type of vehicle. The generally rectangular casing 320 is positioned between the existing brake lights 310. The LED lights 330 are disposed within the generally rectangular casing 320 and are illuminated from left to right as the LED lights 330 become relatively brighter as the brake is increasingly depressed.

The supplemental brake light is intended to prevent rear-end collisions by providing additional brake lights that are solely used to signal when a driver is placing sudden or gradual pressure on the brake. The supplemental brake lights will use LED lights with standard and brighter filaments to notify a driver when the brake is experiencing increased or abrupt pressure that is detected by a sensor that is installed in the brake line. Because the LED lights surround the main brake lights, the supplemental brake light displays a visual diagram that emphasizes the spatial relationship between two vehicles, preventing accidents by allowing a following driver to better foresee any potential hazards. Additional features include an alternative option that features LED lights that surround the main brake lights and illuminate in a series, or sequence of rows, to indicate the different kinds of pressure being applied by the driver. Both of these options are relatively equally effective and will significantly reduce the occurrence of rear-end collisions, thereby saving lives in the process.

The supplemental brake light offers an additional safety feature that can already be installed in new vehicles but can also be available as an aftermarket accessory. The supplemental brake light is compatible with all suitable vehicle makes and models.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

The invention claimed is:

1. A brake light system for a vehicle, comprising:
   an brake light;
   a triangular casing integrated into the top surface of the brake light, with a top tip and a bottom base that is disposed within said existing brake light;
   a plurality of horizontal LED light rows stacked vertically within said triangular casing, where the LED light rows illuminate in a vertical fashion in response to depression of a brake pad of the vehicle; and
   a top tip at the top of the plurality of horizontal LED light rows, where the top tip includes further LED lights and flickers when the brake pad is fully depressed.

2. The supplemental brake light according to claim 1, wherein said triangular casing is inverted with a bottom tip and a top base.

3. The supplemental brake light according to claim 1, wherein said plurality of horizontal LED lights rows become brighter as said brake is increasingly depressed.

* * * * *